(12) United States Patent
Lodge

(10) Patent No.: US 9,004,829 B1
(45) Date of Patent: Apr. 14, 2015

(54) CHIP COLLECTION SYSTEM FOR A KEY CUTTING MACHINE

(76) Inventor: Harold D. Lodge, Bedford, TX (US)

( * ) Notice: Subject to any disclaimer, the term of this patent is extended or adjusted under 35 U.S.C. 154(b) by 496 days.

(21) Appl. No.: 13/546,884

(22) Filed: Jul. 11, 2012

(51) Int. Cl.
*B23C 3/35* (2006.01)
*B23Q 11/00* (2006.01)

(52) U.S. Cl.
CPC ........ *B23Q 11/0067* (2013.01); *B23Q 11/0053* (2013.01); *B23C 3/35* (2013.01)

(58) Field of Classification Search
CPC ... B23Q 11/0067; B23Q 11/0053; B23C 3/35
USPC .............................................. 409/81–83, 137
See application file for complete search history.

(56) References Cited

U.S. PATENT DOCUMENTS

| | | | |
|---|---|---|---|
| D244,277 S | 5/1977 | Der-Avanessian | |
| 4,408,642 A * | 10/1983 | Jeruzal et al. | .............. 144/286.5 |
| 4,813,462 A | 3/1989 | Linn | |
| 4,955,770 A * | 9/1990 | Kitamura | ...................... 409/134 |
| D352,298 S | 11/1994 | Beisbier, Jr. | |
| 5,538,374 A | 7/1996 | Cole et al. | |
| 5,660,509 A * | 8/1997 | Cole et al. | ...................... 409/81 |
| 7,131,180 B2 | 11/2006 | Kopras et al. | |
| 7,509,900 B2 | 3/2009 | Young | |
| 7,527,458 B2 | 5/2009 | Ryai, Sr. et al. | |
| 2005/0135891 A1 | 6/2005 | Ryai, Sr. et al. | |
| 2010/0252542 A1* | 10/2010 | Zeygerman | .............. 219/121.67 |
| 2011/0247527 A1* | 10/2011 | Lin | ................................ 108/33 |

* cited by examiner

*Primary Examiner* — Daniel Howell
*Assistant Examiner* — Ryan Rufo

(57) ABSTRACT

A chip and shaving collection system for a key cutting machine has a trough with a linear first trough drawer rail located on a trough first side and a linear second trough drawer rail located on a trough second side. The trough further has a linear first trough support rail having a general shape of a triangular prism located on a trough first side and a linear second trough support rail having a general shape of a triangular prism located on a trough second side. The system has a plurality of linear support beams located on the support rails. The system has a rigid planar grid member spanning the trough top located on the linear support beams. The system has a drawer that is fluidly sealed located in the trough. The system has a key cutting machine located on the grid member.

2 Claims, 5 Drawing Sheets

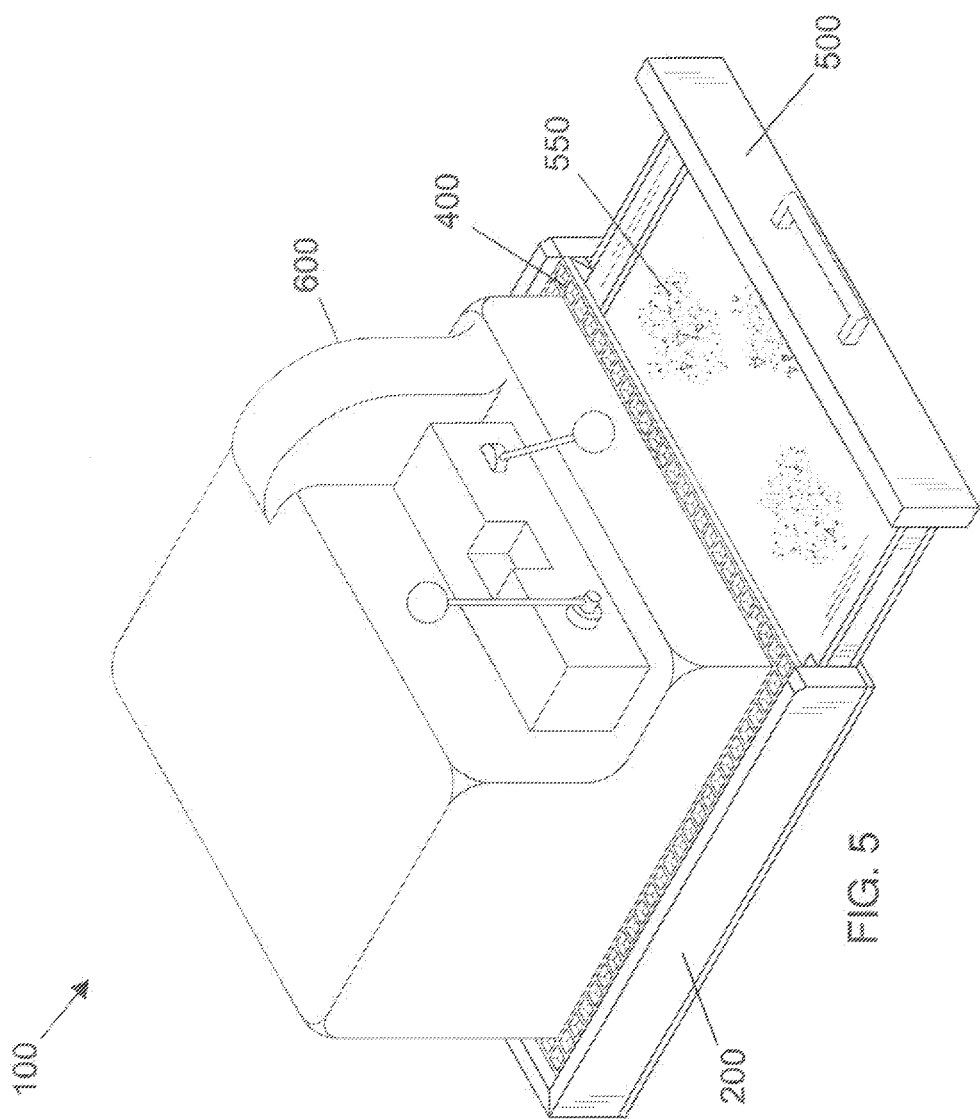

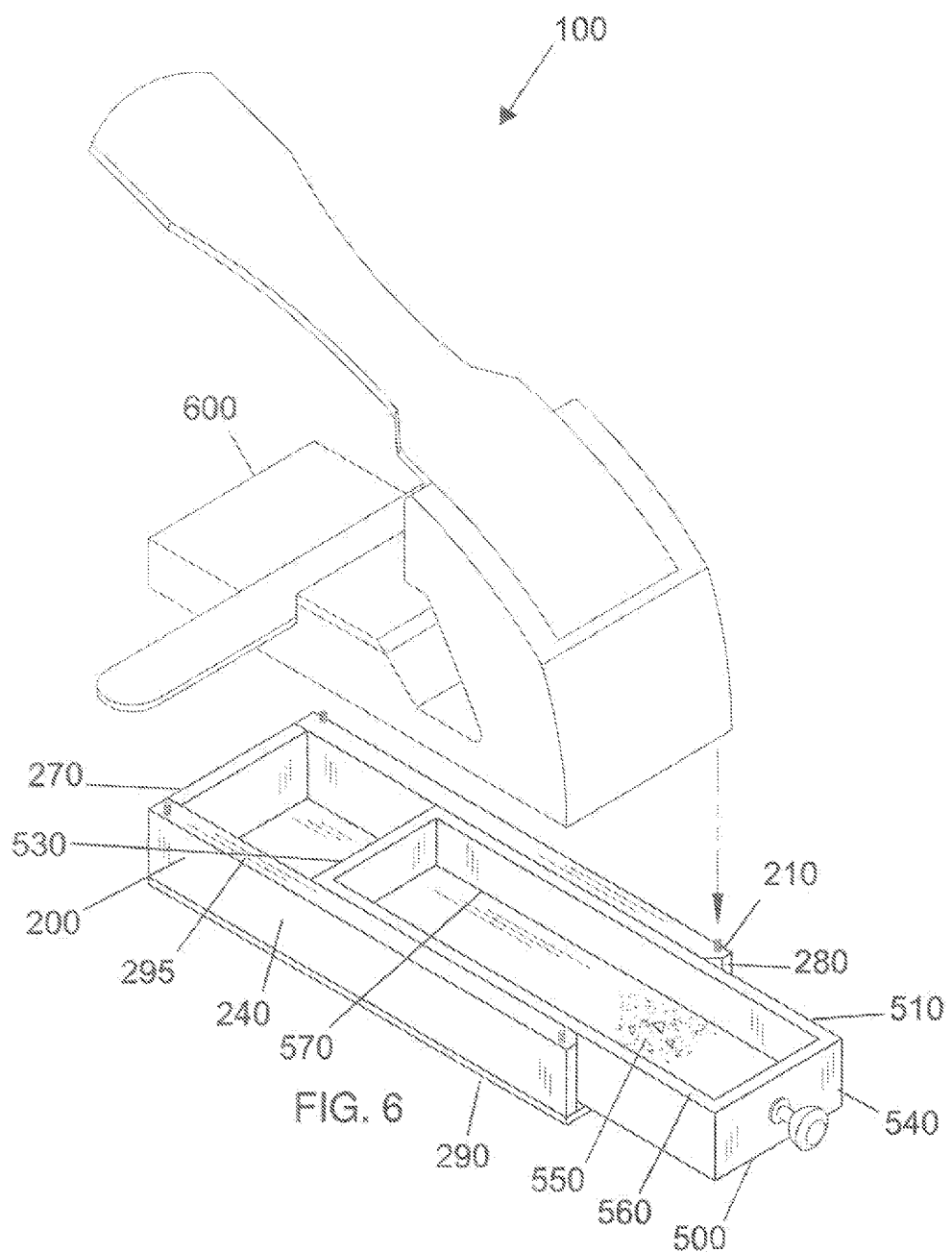

CHIP COLLECTION SYSTEM FOR A KEY CUTTING MACHINE

BACKGROUND OF THE INVENTION

Key cutting is a primary method used for the duplication of keys. In this method, a flat key to be duplicated is fitted into a vise in a key duplication machine. A blank key is then inserted into a parallel vise. For operation, the original key is then moved along a guider simultaneously as the blank is moved against a cutting wheel. This operation duplicates the pattern into the formerly blank key. Once the cutting is complete, the new key is then deburred. The cutting operation removes material from the blank key, transforming it into the form of chips or shavings, and often leaving the area surrounding the key cutting machine quite messy. The present invention features a chip and shaving collection system for a key cutting machine to more effectively manage workspace cleanliness.

SUMMARY

The present invention features a chip and shaving collection system for a key cutting machine. In some embodiments, the system comprises a trough. In some embodiments, the trough further comprises a linear first trough drawer rail located on a trough first side. In some embodiments, the trough further comprises a linear second trough drawer rail located on a trough second side.

In some embodiments, the trough further comprises a linear first trough support rail comprising a general shape of a triangular prism located on a trough first side close to the trough top. In some embodiments, a first trough support rail mounting surface is for supporting a support beam. In some embodiments, the trough further comprises a linear second trough support rail comprising a general shape of a triangular prism located on a trough second side close to the trough top. In some embodiments, a second trough support rail mounting surface is for supporting a support beam.

In some embodiments, the system comprises a plurality of linear support beams. In some embodiments, a support beam first end is located on a first trough support rail mounting surface. In some embodiments, a support beam second end is located on a second trough support rail mounting surface.

In some embodiments, the system comprises a rigid planar grid member. In some embodiments, the grid member spans the trough top. In some embodiments, the grid member is located on the linear support beams. In some embodiments, the system comprises a drawer that is fluidly sealed. In some embodiments, the system comprises a key cutting machine located on the grid member.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

BRIEF DESCRIPTION OF THE DRAWINGS

FIG. 5 is a perspective view of the present invention.

FIG. 6 is a perspective view of an alternate embodiment of the present invention.

DESCRIPTION OF PREFERRED EMBODIMENTS

Figure 1:
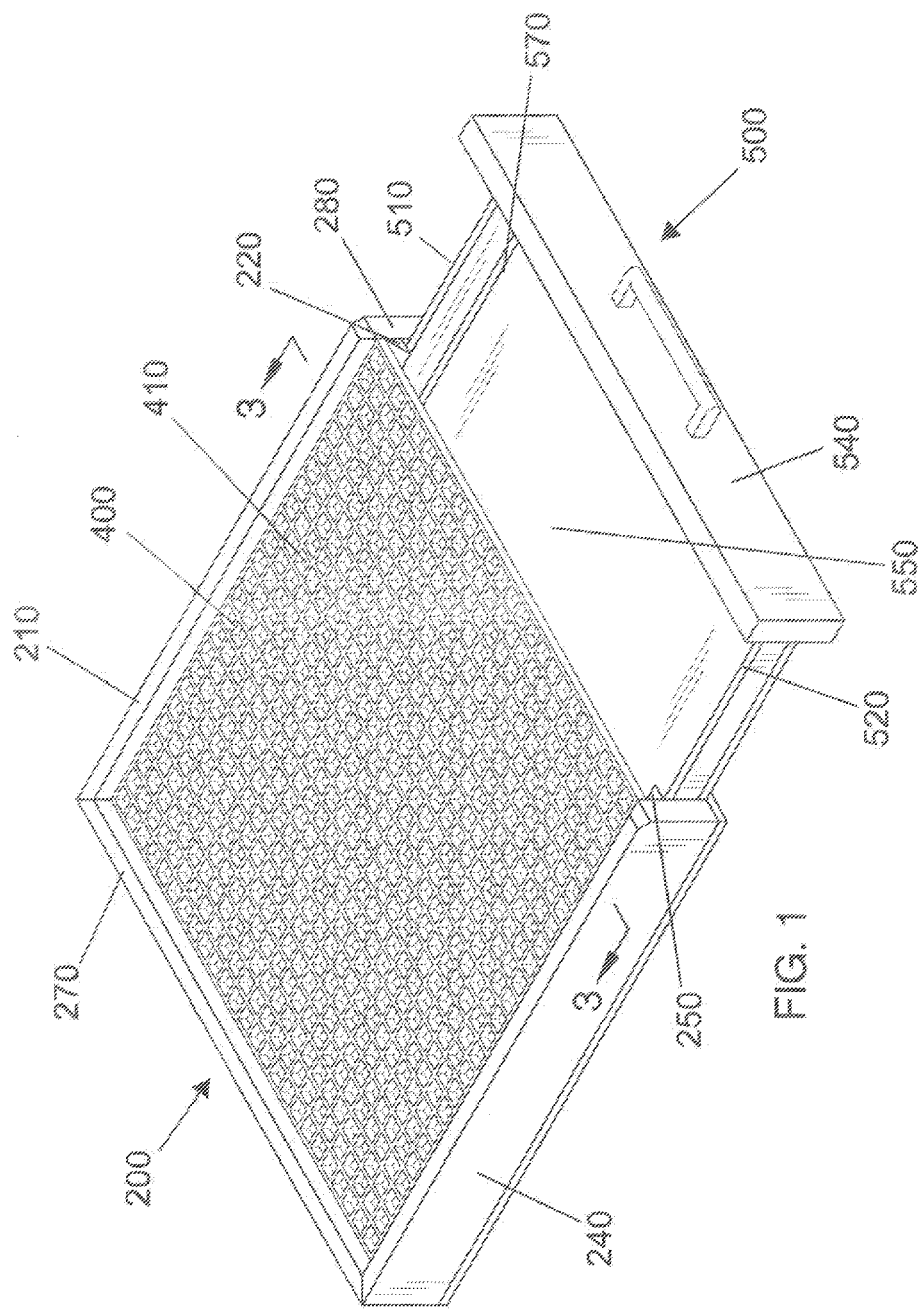
FIG. 1 is a perspective view of the trough, the grid member and the drawer of the present invention.
Figure 2:
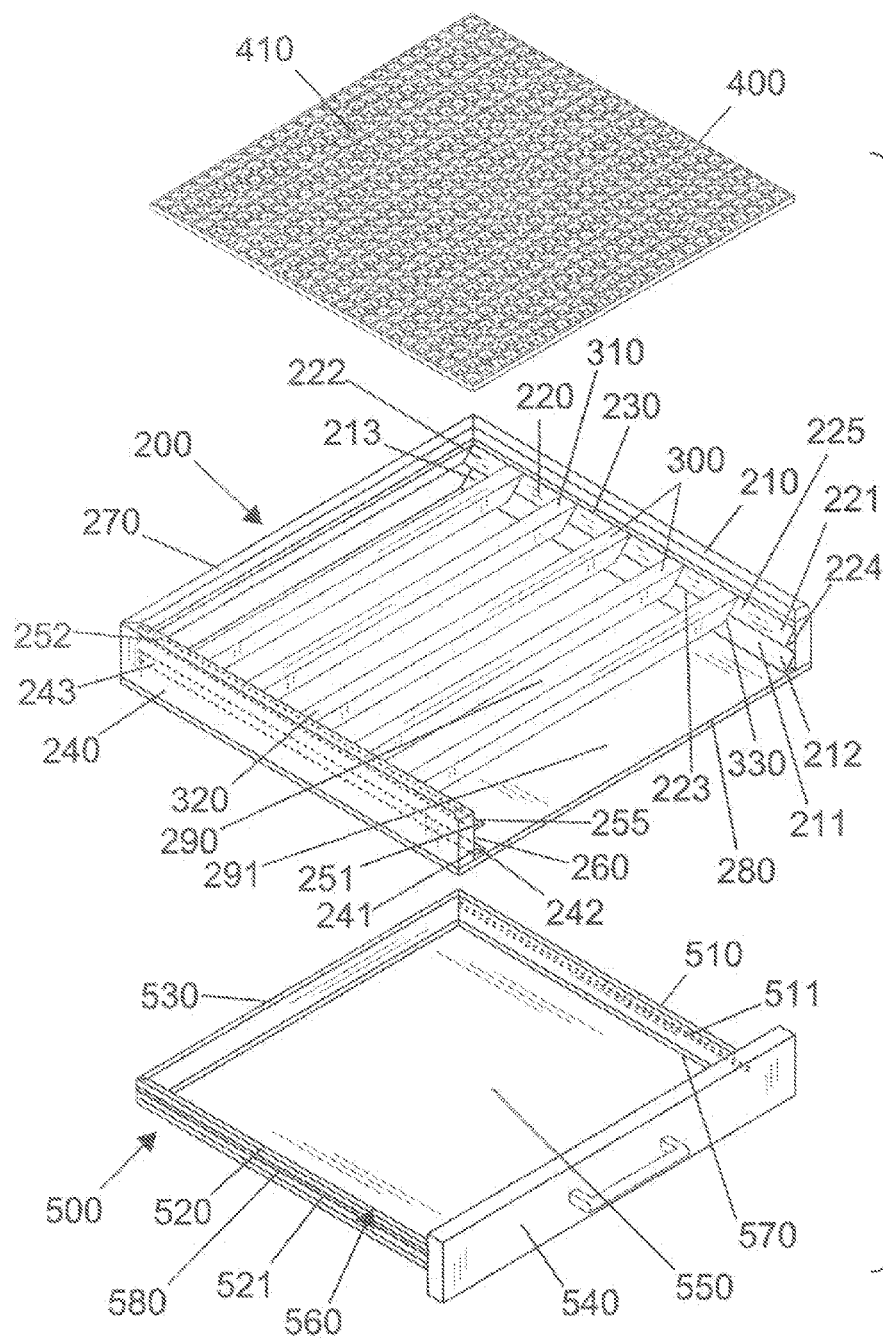
FIG. 2 is an exploded view of the trough, the grid member, the support beams, and the drawer of the present invention.
Figure 3:
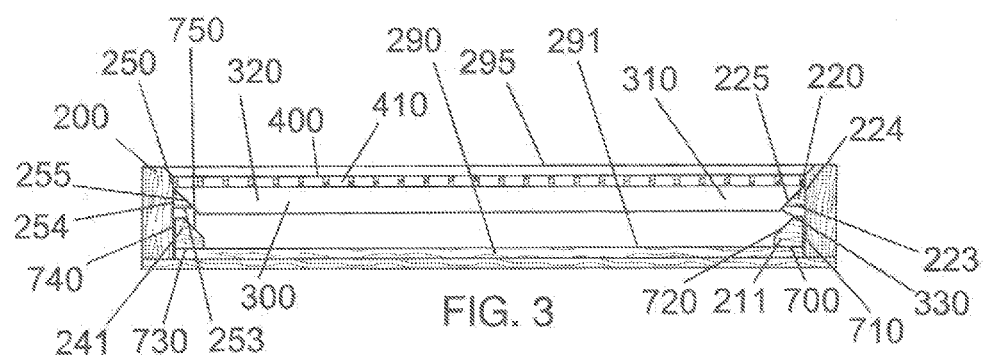
FIG. 3 is a cross-sectional view in a coronal plane of the trough, the grid member, and the support beam of the present invention.
Figure 4:
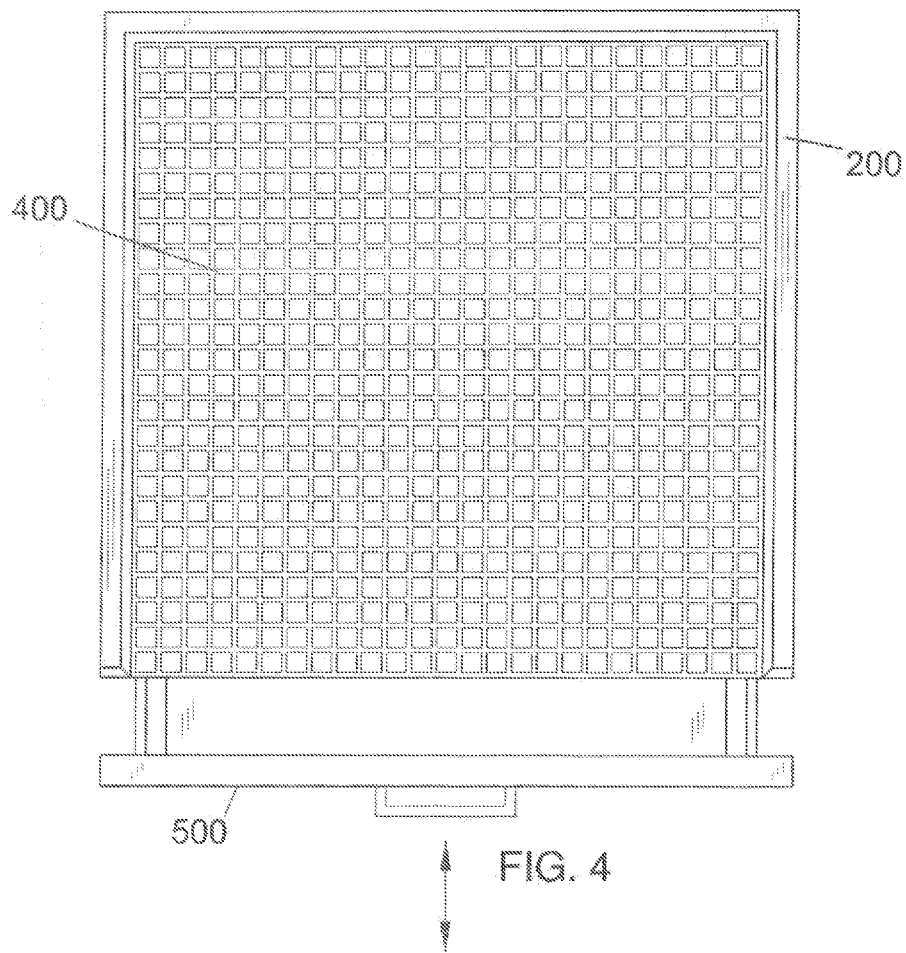
FIG. 4 is an overhead view of the trough, the grid member and the drawer of the present invention.

Following is a list of elements corresponding to a particular element referred to herein:

100 Chip and shaving collection system
200 Trough
210 Trough first side
211 First trough drawer rail
212 First trough drawer rail first end
213 First trough drawer rail second end
220 First trough support rail
221 First trough support rail first end
222 First trough support rail second end
223 First trough support rail bottom surface
224 First trough support rail side surface
225 First trough support rail mounting surface
230 Trough first side inside surface.
240 Trough second side
241 Second trough drawer rail
242 Second-trough drawer rail first end
243 Second trough drawer rail second end.
250 Second trough support rail
251 Second trough support rail first end
252 Second trough support rail second end
253 Second trough support rail bottom surface
254 Second trough support rail side surface
255 Second trough support rail mounting surface
260 Trough second side inside surface
270 Trough back side
280 Trough front side
290 Trough bottom
291 Trough bottom top surface
295 Trough top
300 Support beam
310 Support beam first end
320 Support beam second end
330 Support beam mounting surface
400 Grid member
410 Grid member aperture
500 Drawer
510 Drawer first side
511 Drawer first side mounting rail
520 Drawer second side
521 Drawer second side mounting rail
530 Drawer back side
540 Drawer front side
550 Drawer bottom
560 Drawer top
570 Drawer seam
580 Drawer mounting rail surface
600 Key cutting machine
700 First trough drawer rail bottom surface
710 First trough drawer rail side surface
720 First trough drawer rail sliding surface
730 Second trough drawer rail bottom surface
740 Second trough drawer rail side surface
750 Second trough drawer rail sliding surface Referring now to FIG. 1-6, the present invention features a chip and shaving collection system (100) for a key cutting machine (600). In some embodiments, the system (100) comprises a trough (200) having a trough first side (210), a trough second side (240), a trough back side (270), an open trough front side (280), a trough bottom (290), and an open trough top (295). In some embodiments, the trough (200) further comprises a linear first trough drawer rail (211). In some embodiments, the first trough drawer rail (211) is located on the trough first side (210). In some embodiments, the first trough drawer rail (211) is located in a plane parallel with the trough bottom (290). In some embodiments, a first trough drawer rail first end (212) originates close to the trough front side (280). In some embodiments, a first trough drawer rail second end (213) terminates close to the trough back side (270). In some embodiments, the trough (200) further comprises a linear second trough drawer rail (241). In some embodiments, the second trough drawer rail (241) is located on the trough second side (240). In some embodiments, the second trough drawer rail (241) is located in a plane parallel with the trough bottom (290). In some embodiments, a second trough drawer rail first end (242) originates close to the trough front side (280). In some embodiments, a second trough drawer rail second end (243) terminates close to the trough back side (270).

In some embodiments, the trough (200) further comprises a linear first trough support rail (220) comprising a general shape in a cross-section in a transverse plane of a triangular prism. In some embodiments, the trough (200) further comprises a linear first trough support rail (220) comprising a general shape in a cross-section in a transverse plane of a triangular prism having one or more snubbed edges. In some embodiments, the first trough support rail (220) is located on the trough first side (210) close to the trough top (295). In some embodiments, the first trough support rail (220) is located in a plane parallel with the trough bottom (290). In some embodiments, a first trough support rail first end (221) originates close to the trough front side (280). In some embodiments, a first trough support rail second end (222) terminates close to the trough back side (270). In some embodiments, a first trough support rail bottom surface (223) is parallel to and faces a trough bottom top surface (291). In some embodiments, a first trough support rail side surface (224) interfaces with and is located on a trough first side inside surface (230). In some embodiments, a first trough support rail mounting surface (225) is for supporting a support beam (300).

In some embodiments, the trough (200) further comprises a linear second trough support rail (250) comprising a general shape in a cross-section in a transverse plane of a triangular prism. In some embodiments, the trough (200) further comprises a linear second trough support rail (250) comprising a general shape of a triangular prism having one or more snubbed edges. In some embodiments, the second trough support rail (250) is located on a trough second side (240) close to the trough top (295). In some embodiments, the second trough support rail (250) is located in a plane parallel with the trough bottom (290). In some embodiments, a second trough support rail first end (251) originates close to the trough front side (280). In some embodiments, a second trough support rail second end (252) terminates close to the trough back side (270). In some embodiments, a second trough support rail bottom surface (253) is parallel to and faces a trough bottom top surface (291). In some embodiments, a second trough support rail side surface (254) interfaces with and is located on a trough second side inside surface (260). In some embodiments, a second trough support rail mounting surface (255) is for supporting a support beam (300).

In some embodiments, the system (100) comprises a plurality of linear support beams (300) each having a support beam first end (310) and a support beam second end (320). In some embodiments, the support beam first end (310) comprises a support beam mounting surface (330) located at a complementary angle for interfacing with the first trough support rail mounting surface (225). In some embodiments, a support beam first end (310) is located on a first trough support rail mounting surface (225). In some embodiments, the support beam second end (320) comprises a mounting surface located at a complementary angle for interfacing with the second trough support rail mounting surface (255). In some embodiments, a support beam second end (320) is located on a second trough support rail mounting surface (255). In some embodiments, the support beam (300) traverses the trough top (295) parallel to the trough back side (270) and the trough front side (280).

In some embodiments, the system (100) comprises a rigid planar grid member (400). In some embodiments, the grid member (400) spans the trough top (295). In some embodiments, the grid member (400) is located on the linear support beams (300). In some embodiments, the grid member (400) is located in a plane parallel to the trough bottom (290). In some embodiments, the grid member (400) comprises a plurality of grid member apertures (410) located therein. In some embodiments, the grid member (400) comprises an open area greater than 50 percent. In some embodiments, the grid member (400) comprises an open area greater than 60 percent. In some embodiments, the grid member (400) comprises an open area greater than 70 percent. In some embodiments, the grid member (400) comprises an open area greater than 80 percent. In some embodiments, the grid member (400) comprises an open area greater than 90 percent. In some embodiments, the grid member (400) comprises an open area greater than 95 percent. In some embodiments, the grid member aperture (410) is square. In some embodiments, the grid member aperture (410) is rectangular. In some embodiments, the grid member aperture (410) is round. In some embodiments, the grid member aperture (410) is elliptical. In some embodiments, the grid member aperture (410) is hexagonal. In some embodiments, the grid member aperture (410) is octagonal.

In some embodiments, the system (100) comprises a drawer (500) having a drawer first side (510) having a drawer first side mounting rail (511) linearly located thereon, a drawer second side (520) having a drawer second side mounting rail (521) linearly located thereon, a drawer back side (530), a drawer front side (540), a drawer bottom (550), and an open drawer top (560) for receiving chips or shavings. In some embodiments, the drawer (500) is fluidly sealed. In some embodiments, the drawer first side mounting rail (511) interfaces with and is slidably located on the first trough drawer rail (211). In some embodiments, the drawer second side mounting rail (521) interfaces with and is slidably located on the second trough drawer rail (241).

In some embodiments, the system (100) comprises a key cutting machine (600) located on the grid member (400). In some embodiments, for operation, the trough (200) and the drawer (500) are located beneath the key cutting machine (600). In some embodiments, the key cutting machine (600) is securely supported by the grid member (400) and the support beams (300) above the trough (200) and the drawer (500). In some embodiments, the chip and shaving collection system (100) is for preventing chips and shavings that are generated during key cutting from a key cutting machine (600) from being uncontained. In some embodiments, upon operation of the key cutting machine (600) chips and shavings are generated and gravitationally fall through the grid member (400) via the grid member apertures (410). In some embodiments, the chips and shavings fall into the drawer (500) via the open drawer top (560). In some embodiments, the chips and shavings are collected in the drawer (500) until disposal. In some embodiments, the drawer (500) is fluidly sealed so chips and shavings cannot exit the bottom or sides of the drawer (500) via a drawer seam (570). In some embodiments, there are no unsealed drawer seams (570) inside the drawer to accumulate chips and shavings. In some embodiments, the drawer (500) is of unitary construction with no seams (570). In some embodiments, the drawer (500) is removed from the trough (200) for emptying of the chips and shavings and then replaced.

In some embodiments, the first trough drawer rail (211) comprises a general shape of a triangular prism in a cross-section in a transverse plane. In some embodiments, the first trough drawer rail (211) comprises a general shape of a triangular prism having one or more edges snubbed (which could either create additional edges or reduce the number or edges, but still retain the general shape of the triangular prism). In some embodiments, the first trough drawer rail (211) is located on the trough first side (210) close to the trough bottom (290). In some embodiments, the first trough drawer rail (211) is located in a plane parallel with the trough bottom (290). In some embodiments, a first trough drawer rail first end (212) originates close to the trough front side (280). In some embodiments, a first trough drawer rail second end (213) terminates close to the trough back side (270). In some embodiments, a first trough drawer rail bottom surface (700) is parallel to and faces a trough bottom top surface (291). In some embodiments, a first trough drawer rail side surface (710) interfaces with and is located on a trough first side inside surface (230). In some embodiments, a first trough drawer rail sliding surface (720) slidably interfaces with a drawer (500).

In some embodiments, the linear second trough drawer rail (241) comprises a general shape of a triangular prism in a cross-section in a transverse plane. In some embodiments, the linear second trough drawer rail (241) comprises a general shape of a triangular prism having one or more edges snubbed (which could either create additional edges or reduce the number or edges, but still retain the general shape of the triangular prism). In some embodiments, the second trough drawer rail (241) is located on a trough second side (240) close to the trough bottom (290). In some embodiments, the second trough drawer rail (241) is located in a plane parallel with the trough bottom (290). In some embodiments, a second trough drawer rail first, end (242) originates close to the trough front side (280). In some embodiments, a second trough drawer rail second end (243) terminates close to the trough back side (270). In some embodiments, a second trough drawer rail bottom surface (730) is parallel to and faces a trough bottom top surface (291). In some embodiments, a second trough drawer rail side surface (740) interfaces with and is located on a trough second side inside surface (260). In some embodiments, a second trough drawer rail sliding surface (750) slidably interfaces with a drawer (500). In some embodiments, the drawer first side mounting rail (511) comprises a drawer mounting rail surface (580) located at a complementary angle for slidably interfacing with the first trough drawer rail sliding surface (720). In some embodiments, the drawer second side mounting rail (521) comprises a drawer mounting rail surface (580) located at a complementary angle for slidably interfacing with the second trough drawer rail sliding surface (750). In some embodiments, the drawer (500) is slidably located in the trough (200).

In some embodiments a portable version of the system (100) does not comprise support beams (300) or a grid member (400). In some embodiments, the trough (200) containing the drawer (500) can be used with another chip and shaving generating tool.

Referring now to FIG. 6, the present invention features a chip and shaving collection system (100) for a key cutting machine (600). In some embodiments, the system (100) comprises a trough (200) having a trough first side (210), a trough second side (240), a trough back side (270), an open trough front side (280), a trough bottom (290), and an open trough top (295).

In some embodiments, the system (100) comprises a drawer (500) having a drawer first side (510), a drawer back side (530), a drawer front side (540), a drawer bottom (550), and an open drawer top (560) for receiving chips or shavings. In some embodiments, the drawer (500) is fluidly sealed. In some embodiments, the drawer (500) is slidably located in the trough (200).

In some embodiments, the system (100) comprises a key cutting machine (600).

In some embodiments the system (100) is of a size as to not necessitate comprise support beams (300) or a grid member (400). For example, in some embodiments, the trough (200) is less than about 2 inches in width from the trough first side (210) to the trough second side (240). In some embodiments, the trough (200) is between about 2 inches and about 4 inches in width from the trough first side (210) to the trough second side (240). In some embodiments, the trough (200) is between about 4 inches and about 6 inches in width from the trough first side (210) to the trough second side (240). In some embodiments, the trough (200) is between about 6 inches and about 8 inches in width from the trough first side (210) to the trough second side (240). In some embodiments, the trough (200) is between about 8 inches and about 10 inches in width from the trough first side (210) to the trough second side (240). In some embodiments, the trough (200) is greater than about 10 inches in width from the trough first side (210) to the trough second side (240).

For example, in some embodiments, the trough (200) is less than about 2 inches in length from the trough back side (270) to the trough front side (280). In some embodiments, the trough (200) is between about 2 inches and about 4 inches in length from the trough back side (270) to the trough front side (280). In some embodiments, the trough (200) is between about 4 inches and about 6 inches in length from the trough back side (270) to the trough front side (280). In some embodiments, the trough (200) is between about 6 inches and about 8 inches in length from the trough back side (270) to the trough front side (280). In some embodiments, the trough (200) is between about 8 inches and about 10 inches in length from the trough back side (270) to the trough front side (280). In some embodiments, the trough (200) is greater than about 10 inches in length from the trough back side (270) to the trough front side (280).

In some embodiments, for operation, the trough (200) and the drawer (500) are located beneath (and the trough (200) securely attached to) the key cutting machine (600). In some embodiments, the chip and shaving collection system (100) is for preventing chips and shavings that are generated during key cutting from a key cutting machine (600) from being uncontained. In some embodiments, the chips and shavings fall into the drawer (500) via the open drawer top (560). In some embodiments, the chips and shavings are collected in the drawer (500) until disposal. In some embodiments, the drawer (500) is fluidly sealed so chips and shavings cannot exit the bottom or sides of the drawer (500) via a drawer seam (570). In some embodiments, there are no unsealed drawer seams (570) inside the drawer to accumulate chips and shavings. In some embodiments, the drawer (500) is of unitary construction with no seams (570). In some embodiments, the drawer (500) is removed from the trough (200) for emptying of the chips and shavings and then replaced.

As used herein, the term "about" refers to plus or minus 10% of the referenced number. For example, an embodiment wherein the trough is about 10 inches in length includes a trough that is between 9 and 11 inches in length.

The disclosures of the following U.S. patents are incorporated in their entirety by reference herein: U.S. Pat. No. D 352,298; U.S. Pat. No. D 244,277; U.S. Pat. Pub. No. 2005/0135891; U.S. Pat. No. 7,527,458; U.S. Pat. No. 7,509,900; U.S. Pat. No. 7,131,180; U.S. Pat. No. 5,538,374;

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

The reference numbers recited in the below claims are solely for ease of examination of this patent application, and are exemplary, and are not intended in any way to limit the scope of the claims to the particular features having the corresponding reference numbers in the drawings.

What is claimed is:

1. A chip and shaving collection system (100) for a key cutting machine (600), wherein said system (100) comprises:
    (a) a trough (200) having a trough first side (210), a trough second side (240), a trough back side (270), an open trough front side (280), a trough bottom (290), and an open trough top (295), wherein the trough (200) further comprises a linear first trough drawer rail (211), wherein the first trough drawer rail (211) is disposed on the trough first side (210), wherein the first trough drawer rail (211) is disposed in a plane parallel with the trough bottom (290), wherein a first trough drawer rail first end (212) originates proximal to the trough front side (280), wherein a first trough drawer rail second end (213) terminates proximal to the trough back side (270), wherein the trough (200) further comprises a linear second trough drawer rail (241), wherein the second trough drawer rail (241) is disposed on the trough second side (240), wherein the second trough drawer rail (241) is disposed in a plane parallel with the trough bottom (290), wherein a second trough drawer rail first end (242) originates proximal to the trough front side (280), wherein a second trough drawer rail second end (243) terminates proximal to the trough back side (270), wherein the trough (200) further comprises a linear first trough support rail (220) comprising a general shape of a triangular prism, wherein the first trough support rail (220) is disposed on the trough first side (210) proximal to the trough top (295), wherein the first trough support rail (220) is disposed in a plane parallel with the trough bottom (290), wherein a first trough support rail first end (221) originates proximal to the trough front side (280), wherein a first trough support rail second end (222) terminates proximal to the trough back side (270), wherein a first trough support rail bottom surface (223) is parallel to and faces a trough bottom top surface (291), wherein a first trough support rail side surface (224) interfaces with and is disposed on a trough first side inside surface (230), wherein a first trough support rail mounting surface (225) is for supporting a support beam (300), wherein the trough (200) further comprises a linear second trough support rail (250) comprising a general shape of a triangular prism, wherein the second trough support rail (250) is disposed on the trough second side (240) proximal to the trough top (295), wherein the second trough support rail (250) is disposed in a plane parallel with the trough bottom (290), wherein a second trough support rail first end (251) originates proximal to the trough front side (280), wherein a second trough support rail second end (252) terminates proximal to the trough back side (270), wherein a second trough support rail bottom surface (253) is parallel to and faces the trough bottom top surface (291), wherein a second trough support rail side surface (254) interfaces with and is disposed on a trough second side inside surface (260), wherein a second trough support rail mounting surface (255) is for supporting the support beam (300);
    (b) a plurality of linear support beams (300) having a support beam first end (310) and a support beam second end (320), wherein the support beam first end (310) comprises a first support beam mounting surface (330) disposed at a complementary angle for interfacing with the first trough support rail mounting surface (225), wherein the support beam first end (310) is disposed on the first trough support rail mounting surface (225), wherein the support beam second end (320) comprises a second support beam mounting surface (330) disposed at a complementary angle for interfacing with the second trough support rail mounting surface (255); wherein the support beam second end (320) is disposed on the second trough support rail mounting surface (255), wherein the support beam (300) traverses the trough top (295) parallel to the trough back side (270) and the trough front side (280);
    (c) a rigid planar grid member (400), wherein the grid member (400) spans the trough top (295), wherein the grid member (400) is disposed on the linear support beams (300), wherein the grid member (400) is disposed in a plane parallel to the trough bottom (290), wherein the grid member (400) comprises a plurality of grid member apertures (410) disposed therein, wherein the grid member (400) comprises an open area greater than 50 percent;
    (d) a drawer (500) comprising a drawer first side (510) having a drawer first side mounting rail (511) linearly disposed thereon, a drawer second side (520) having a drawer second side mounting rail (521) linearly disposed thereon, a drawer back side (530), a drawer front side (540), a drawer bottom (550), and an open drawer top (560) for receiving chips or shavings, wherein the drawer (500) is fluidly sealed in a plurality of seams (570), wherein the drawer comprises either leakproof seams (570) or unitary construction, wherein the drawer first side mounting rail (511) interfaces with and is slidably disposed on the first trough drawer rail (211), wherein the drawer second side mounting rail (521) interfaces with and is slidably disposed on the second trough drawer rail (241);

(e) a key cutting machine (600) disposed on the grid member (400);

wherein for operation, the trough (200) and the drawer (500) are disposed beneath the key cutting machine (600), wherein the key culling machine (600) is securely supported by the grid member (400) and the support beams (300) above the trough (200) and the drawer (500), wherein the chip and shaving collection system (100) is for preventing chips and shavings that are generated during key cutting from a key cutting machine (600) from being uncontained, wherein upon operation of the key cutting machine (600) chips and shavings are generated and gravitationally fall through the grid member (400) via the grid member apertures (410), wherein, the chips and shavings fall into the drawer (500) via the open drawer top (560), wherein the chips and shavings are collected in the drawer (500) until disposal, wherein the drawer (500) is fluidly sealed so chips and shavings cannot exit the drawer (500) via the drawer seam (570), wherein there are no unsealed drawer seams (570) inside the drawer to accumulate chips and shavings, wherein the drawer (500) is removed from the trough (200) for emptying of the chips and shavings and replaced.

2. The system of claim 1, wherein the first trough drawer rail (211) comprises a general shape of a triangular prism, wherein the first trough drawer rail (211) is disposed on the trough first side (210) proximal to the trough bottom (290), wherein the first trough drawer rail (211) is disposed in a plane parallel with the trough bottom (290), wherein the first trough drawer rail first end (212) originates proximal to the trough front side (280), wherein the first trough drawer rail second end (213) terminates proximal to the trough back side (270), wherein a first trough drawer rail bottom surface (700) is parallel to and faces the trough bottom top surface (291), wherein a first trough drawer rail side surface (710) interfaces with and is disposed on the trough first side inside surface (230), wherein a first trough drawer rail sliding surface (720) slidably interfaces with the drawer (500), wherein the linear second trough drawer rail (241) comprising a general shape of a triangular prism, wherein the second trough drawer rail (241) is disposed on the trough second side (240) proximal to the trough bottom (290), wherein the second trough drawer rail (241) is disposed in a plane parallel with the trough bottom (290), wherein the second trough drawer rail first end (242) originates proximal to the trough front side (280), wherein the second trough drawer rail second end (243) terminates proximal to the trough back side (270), wherein a second trough drawer rail bottom surface (730) is parallel to and faces the trough bottom top surface (291), wherein a second trough drawer rail side surface (740) interfaces with and is disposed on the trough second side inside surface (260), wherein a second trough drawer rail sliding surface (750) slidably interfaces with the drawer (500), wherein the drawer first side mounting rail (511) comprises a first drawer mounting rail surface (580) disposed at a complementary angle for slidably interfacing with the first trough drawer rail sliding surface (720), wherein the drawer second side mounting rail (521) comprises a second drawer mounting rail surface (580) disposed at a complementary angle for slidably interfacing with the second trough drawer rail sliding surface (750), wherein the drawer (500) is slidably disposed in the trough (200).

* * * * *